United States Patent [19]

Simpson et al.

[11] Patent Number: 4,546,118

[45] Date of Patent: Oct. 8, 1985

[54] EPOXY FOAM

[75] Inventors: Scott S. Simpson, Woodstock; Anthony Yeznach, Norwich; Carlos L. Barton, Brooklyn, all of Conn.

[73] Assignee: Rogers Corporation, Rogers, Conn.

[21] Appl. No.: 662,589

[22] Filed: Oct. 19, 1984

[51] Int. Cl.⁴ .............................. C08J 9/30
[52] U.S. Cl. .................... 521/130; 521/133; 521/178; 521/97; 521/82
[58] Field of Search ............ 521/133, 130, 178, 97, 521/82

[56] References Cited

U.S. PATENT DOCUMENTS

| | | |
|---|---|---|
| 3,362,919 | 1/1968 | Rood .................................. 521/178 |
| 3,600,337 | 8/1971 | Fischer et al. .................... 521/178 |
| 3,607,795 | 9/1971 | Nolken et al. .................... 521/178 |
| 4,120,923 | 10/1978 | Kloker et al. .................... 521/178 |

Primary Examiner—Morton Foelak
Attorney, Agent, or Firm—Fishman & Dionne

[57] ABSTRACT

An epoxy foam product is presented which is produced by frothing in an intensive mixer an epoxy functional reactant stream and a curing agent stream in the presence of a surfactant and gaseous frothing agent. The epoxy foam product is characterized as a strong, rigid low-density foam having a fine, uniform cell size.

17 Claims, 1 Drawing Figure

EPOXY FOAM

BACKGROUND OF THE INVENTION

This invention relates to an epoxy foam and a method of producing the same. More particularly, this invention relates to a foam produced by means of the mechanical frothing of an epoxy formulation to allow fabrication of low density molded pieces for use in, for example, electrical or electronic applications having selectively tailored dielectric constants.

It is known that the incorporation of a gas in an epoxy formulation provides reduced dielectric constants. Accordingly, for those applications wherein dielectric constant is criticial or where a low dielectric constant is preferred, such as in the electronics art, foamed epoxy formulations find great utility.

In producing foamed epoxy, to insure quality materials and consistency in electrical (i.e., dielectric) and physical properties, such structural features such as density, cell size and cell uniformity must be strictly controlled and maintained. Unfortunately, prior art foamed epoxy formulations are often inconsistent and unacceptable in terms of the above-mentioned structural and electrical characteristics.

SUMMARY OF THE INVENTION

The above discussed and other problems of the prior art are overcome or alleviated by the epoxy foam and method of making the same of the present invention. In accordance with the present invention, foam produced by the mechnical frothing of an epoxy formulation is provided which allows fabrication of low density molded pieces for electric or electronic applications. The epoxy foamed product is characterized as a rigid foam of uniform density, fine cell structure and uniform cell size. The epoxy foam is also useful for applications wherein a strong, rigid, low density material is used as a substrate or core.

Specifically, one embodiment of the process for proudcing the foam is as follows:

(a) A stream of an epoxy-functional component and a stream of a suitable curing agent (and accelerator) are intensively mixed with a stream of a surfactant;

(b) While mixing these streams in an intensive mixer, a frothing agent is combined therewith;

(c) The reactant mixture is injected into heated molds where it is allowed to cure; and (d) Alternatively, the reactant mixture may be continuously cast onto a moving belt and cured to form continous sheet stock.

(e) The resultant product that is removed from the molds (or belt) is a strong, rigid structural foam having fine, uniform cell size and uniform density.

In a second embodiment, the epoxy functional component, curing agent and surfactant are initially premixed in a single tank prior to being added to an intensive mixer along with the frothing agent.

The above discussed and other advantages of the present invention will be apparent to and understood by those skilled in the art from the following detailed description and drawing.

Figure 1:
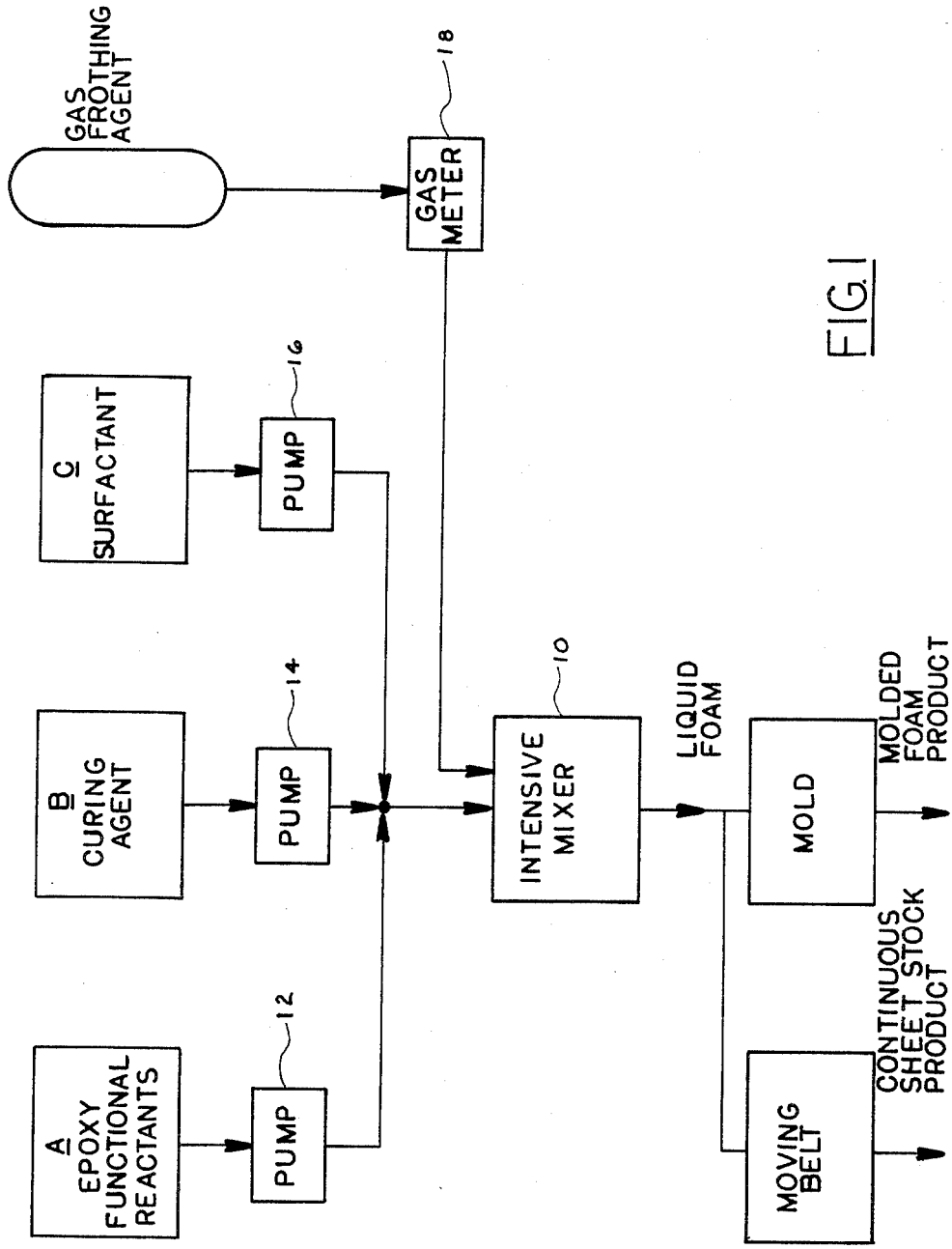
FIG. 1 is a block diagram generally identifying the method of producing the epoxy foam of the present invention.

DESCRIPTION OF THE PREFERRED EMBODIMENT:

Referring to FIG. 1, in a first embodiment of the present invention, the frothed epoxy product is prepared from two (2) reactant streams and a third stream containing a surfactant. Stream A contains an epoxy-functional component and may be run at room temperature or above to maintain fluidity. Stream B contains a curing agent preferably mixed with an accelerator. Stream A and stream B are brought together in an intensive mixer with surfactant (stream C) and a frothing agent which is preferably comprised of an inert gas. The resultant epoxy/curing agent/frothing agent/surfactant mixture is delivered to a preheated mold or carrier for generation of molded articles or sheet stock. It will be appreciated that continous sheet stock may be generated by casting onto a moving carrier belt, doctoring to the desired thickness and passing the belt through a tunnel oven to effect cure. Post-cure of molded articles may be necessary to effect maximum properties, depending on the epoxy formulation and cure schedule.

Referring again to FIG. 1, the various streams A, B and C are delivered to mixer 10 via pumps 12, 14 and 16 while gas is injected into mixer 10 by a gas meter 18. It will be appreciated that the resin/curing agent/surfactant mixture may be charged to one tank and then pumped directly into the intensive mixer to be blended with a frothing agent (i.e., inert gas).

An alternative method of producing the epoxy foam of the present invention is to premix the epoxy-functional component, curing agent and surfactant in a single tank followed by adding the single premixed stream to an intensive mixer with a frothing agent. Pre-mixing of all or part of the raw material sis possible because of the well-known sluggish reaction of epoxy resins at room temperature. Pre-mixing may be preferable over the heretofore discussed use of separate streams (and tanks) as a single tank greatly simplifies the process as well as reducing costs. However, one significant drawback to premixing is that the single mixture has a "shelf" or "pot" life and therefore may be rendered unusable if not processed in time. Subsequent to frothing in the intensive mixer, the epoxy foam is molded or cast as continous sheet stock as discussed above.

A preferred type of curing agent is an anhydride although the curing agent is not limited to anhydrides, but may be any suitable curing agent known in the art. Similarly, the surfactant may be any compatible with the epoxy curing agent system. The ratio of epoxy to curing agent may be varied to suit the end use of final application, but preferably should not greatly exceed a stoichiometric ratio of 1.0 equivalent of curing agent to 1.0 equivalent of epoxy.

The mechanically frothed epoxy formulation and method of manufacture of the present invention permits tailoring the dielectric for circuit substrates without alteration of the material formulation. Thus, depending upon degree of frothing, dielectric constant of the foamed epoxy may be varied as desired. As stated, the process of the present invention also provides a strong, rigid, low-density material having a fine, uniform cell size which is aptly suited for electrical or electronic applications such as a circuit substrate or core. The present invention, therefore, is well suited for those applications wherein dielectric constant, especially low dielectric constant, is critical.

The following examples are provided to further illustrate the scope of the present invention; however, they should not be considered to be limiting thereof.

The apparatus used in all the examples comprises a bank of component tanks and metering pumps for the liquid components, a pressurized gas vessel and gas metering device, and an intensive mixer. As already discussed, FIG. 1 is a process schematic demonstrating two component tanks, a surfactant tank, a gas vessel, and an intensive mixer. It will be understood that the number of tanks and pumps is adjusted to reflect the number of liquid components or liquid component mixtures. It will be appreciated that in Example 1, the surfactant of stream C has already been mixed with the epoxy functional reactant (stream A).

EXAMPLE 1

2000 grams of Epon 828 (a diglycidal ether of Bisphenol A) and 200 grams of Union Carbide L5614 surfactant where mixed and placed in tank A. 2980 grams of a liquid mixture of anhydrides (comprising 65% hexahydrophthalic anhydride; and 35% polyazelaic poly anhydride) and 55.2 grams of Cordova ATC-3 accelerator were mixed and placed in Tank B. Streams from tank A and tank B were pumped into an intensive mixer at a 2:1 weight ratio, along with nitrogen gas. The mixture was then injected into heated molds and cured at 100° C. for 30 minutes with a subsequent postcure of 1 hour at 149° C. The product was a rigid low density foam with signs of over cure.

EXAMPLE 2

Tank A was charged with 6000 grams of Shell Epon 828 and 2016 grams of prereact comprising 1200 gram Epon 828, 800 gram Hycar CTBN 1300X8 and 16 g ATC-3 accelerator, mixed and reacted at 50° for 2 hours prior to being placed in tank A. Tank B was charged with 2665 grams hexahydrophthalic anhydride, 1435 g polyazelaic polyanhydride and 59 g ATC-3 accelerator. Tank C was charged with L5614 surfactant. Streams A, B and C were introduced into an intensive mixer in weight ratios of 1:0.49:0.09 with varying amounts of nitrogen gas. The mixture was injected into a mold preheated to 100° C. and cured for 30 minutes at 100° C. Ten samples were made at varying densities and postcured 17 hours at 100° C. with an additional 2 hours at 120° C. The foam density after post-cure ranged from 18 pcf to 43 pcf. The 43 pcf sample showed some evidence of drainage, while the samples from 32 pcf to 18 pcf showed little or no evidence of drainage. Samples were characterized as being rigid and of uniform cell structure. Samples produced from these reactants without any gas included were hard, rigid samples at 63–64 pcf density.

EXAMPLE 3

Tank A was charged with a mixture comprising:
 100 parts Epon 828
 3.38 parts ATC-3
 1.12 parts DMP-10
Tank B was charged with a mixture comprising:
 100 parts AC-220J
 25 parts Epon 828
Tank C was charged with:
 L-5614 Surfactant (Union Carbide)
Flow rate ratios by weight were:
 A:B:C::0.83:1.0:0.07

Nitrogen was introduced prior to the intensive mixer to give a wet product density of 26–30 pcf. After a 60 minute, 100° C. cure, the molded product density was 22–23 pcf, and the product was characterized as a uniform fine-celled foam.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A process for preparing an epoxy resin foam including the steps of:
 mixing an epoxy resin stream with a curing agent stream in an intensive mixer;
 adding a surfactant and a inert gaseous frothing agent to said mixture and mechanically frothing said mixture; and
 curing said frothed mixture to form said epoxy resin foam.

2. The process of claim 1 including the further steps of:
 injecting said frothed mixture into a mold; and
 curing said frothed mixture in said mold to form molded epoxy resin foam.

3. The process of claim 1 including the further steps of:
 casting said frothed mixture onto a continous belt; and
 curing said frothed mixture on said belt to form continuous sheet stock epoxy resin foam.

4. The process of claim 3 including the further step of: doctoring said casted frothed mixture to a desired thickness.

5. The process of claim 3 wherein:
 said frothed mixture is cured in a tunnel oven.

6. The process of claim 1 including:
 adding an accelerator to said mixture.

7. The process of claim 1 wherein:
 said inert gas is nitrogen gas.

8. The process of claim 1 wherein said curing agent is an anhydride.

9. The process of claim 2 wherein:
 said mold is preheated.

10. A process for preparing an epoxy resin foam including the steps of:
 premixing an epoxy resin, a curing agent, and a surfactant to form a premixture stream;
 combining said premixture stream and an inert gaseous frothing agent in an intensive mixer so as to mechanically froth said premixture stream; and
 curing said frothed premixture to form said epoxy resin foam.

11. The process of claim 10 including the further steps of:
 injecting said frothed mixture into a mold; and
 curing said frothed mixture in said mold to form molded epoxy resin foam.

12. The process of claim 10 including the further steps of:
 casting said frothed mixture onto a continous belt; and
 curing said frothed mixture on said belt to form continuous sheet stock epoxy resin foam.

13. The process of claim 12 including the further step of:
 doctoring said casted frothed mixture to a desired thickness.

14. The process of claim 12 wherein:

said frothed mixture is cured in a tunnel oven.
15. The process of claim 10 including:
adding an accelerator to said mixture.
16. The process of claim 10 wherein:
said inert gas is nitrogen gas.
17. The process of claim 10 wherein said curing agent is an anhydride.

* * * * *